United States Patent [19]

Smith

[11] 4,176,935
[45] Dec. 4, 1979

[54] MOTORIZED LENS RING ADJUSTOR FOR STILL CAMERA LENS

[76] Inventor: George Smith, 166 Vine Rd., Stamford, Conn. 06905

[21] Appl. No.: 844,800

[22] Filed: Oct. 25, 1977

[51] Int. Cl.² ............................................. G03B 13/02
[52] U.S. Cl. .................................................... 354/195
[58] Field of Search ................ 352/140; 354/196, 202, 354/195, 25

[56] References Cited

U.S. PATENT DOCUMENTS

| | | | |
|---|---|---|---|
| 1,271,929 | 7/1918 | Nelson | 352/140 |
| 3,400,212 | 9/1968 | Plummer | 354/195 X |
| 3,847,474 | 11/1974 | Uterhart | 354/195 X |
| 3,883,883 | 5/1975 | Sano et al. | 352/140 X |
| 3,940,777 | 2/1976 | Komine | 352/140 X |
| 4,083,057 | 4/1978 | Quinn | 352/140 X |

*Primary Examiner*—Donald A. Griffin
*Attorney, Agent, or Firm*—Edward J. Mahler

[57] ABSTRACT

An accessory apparatus for motorized still camera lens ring adjustment is disclosed. The apparatus includes a connector for attaching the apparatus to camera body or lens and a wheel which is motor driven and suitable brackets for positioning the wheel against a lens adjustment ring. A switch is provided to selectively actuate the motor to drive the wheel so as to adjust the lens adjustment ring.

14 Claims, 8 Drawing Figures

MOTORIZED LENS RING ADJUSTOR FOR STILL CAMERA LENS

This invention relates to still camera accessories and specifically to motorized accessories for still cameras.

Zoom lenses for still cameras customarily have at least two adjustment rings, one for focusing the lens and one for zooming the lens. However, a problem arises in that it is cumbersome to handle the camera body, where the shutter is conventionally found, while also adjusting both the zoom ring and focus ring and looking through the lens. Since adjusting the zoom ring generally throws the image out of focus, it is necessary with conventional still camera apparatus to alternately adjust the zoom and focus rings until a "match" is achieved where the proper field of view or magnification is achieved by proper adjustment of the zoom ring and the focus is properly set to achieve a clear picture at that particular zoom setting. This "match" must then be repeated for each new zoom ring adjustment. In the case of photographers who take many pictures of varied objects at various zoom settings, there is a need presented for an accessory which simplifies this operation.

In expensive motion picture cameras, there is known an automatic zoom-focus correlation mechanism built into the movie camera as an integral part. However, such automatic focus adjusters are not suitable for the vast array of existing still cameras which do not have such an integral mechanism.

It is thus an object of the invention to provide an accessory which is readily attachable to many still cameras and which simplifies operation of lens adjustment rings.

This object and the above noted problems and others are solved by the apparatus of the present invention which provides an accessory for a still camera of the type having a body, a lens projecting from said camera body, an adjustment ring on said lens and an accessory connector on at least one of said body and lens. The accessory comprises connector means for attaching said accessory to said accessory connector of said camera; a wheel means for rotatably engaging said adjustment ring of said lens; a self-contained motor, operably attached to said wheel means, for rotating said wheel in response to a signal; adjustable bracket means for supporting said motor means, attaching said accessory to said connector means and adjustably positioning said wheel into said engagement with said adjustment ring.

The advantages and objects of the invention will be better understood when considered in conjunction with the attached drawing, in which FIG. 1 is a right, top, front perspective view of a preferred embodiment of the apparatus of the invention attached to a still camera body;

FIGS. 1-4 are various views of a first embodiment of the invention, while FIGS. 5-7 are views of a modified embodiment. FIG. 8 is common to both embodiments. All numbers refer to the same parts of each of the drawings.

Figure 1:
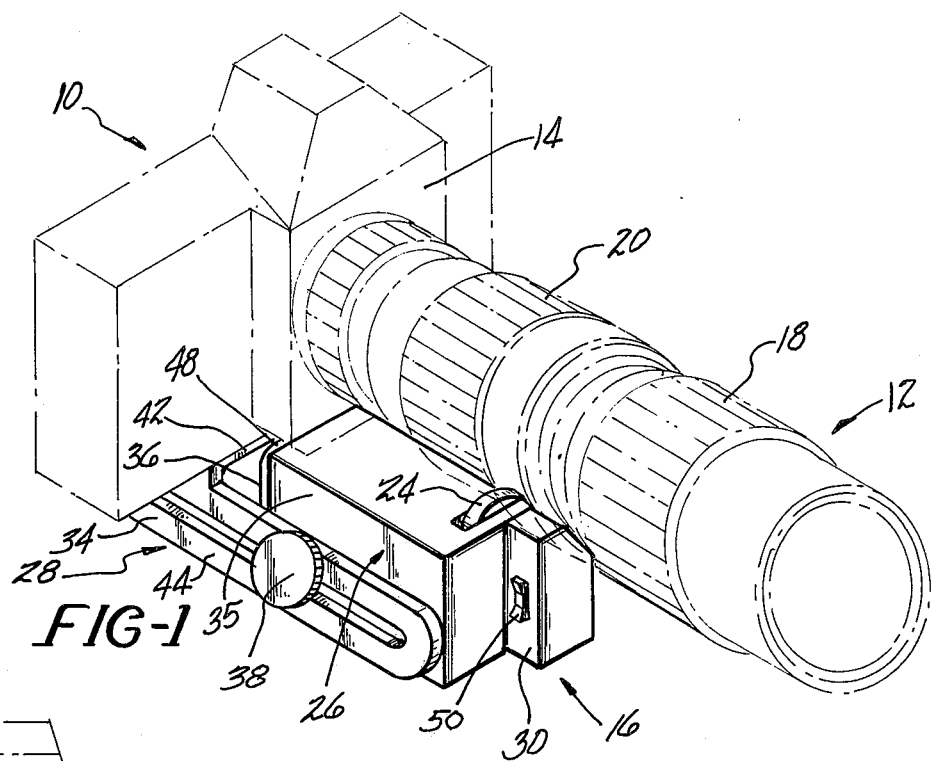
Figure 2:
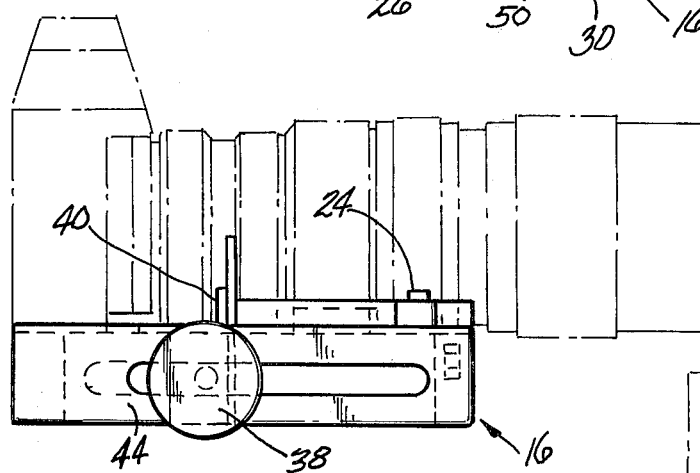
FIG. 2 is a side elevational view of the apparatus of FIG. 1.
Figure 3:
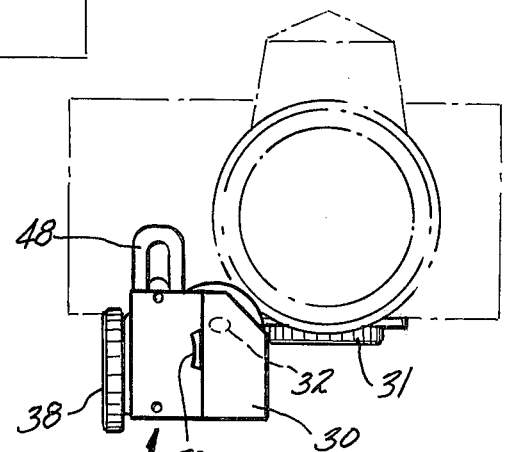
FIG. 3 is a front elevational view of the apparatus of FIGS. 1 and 2.
Figure 4:
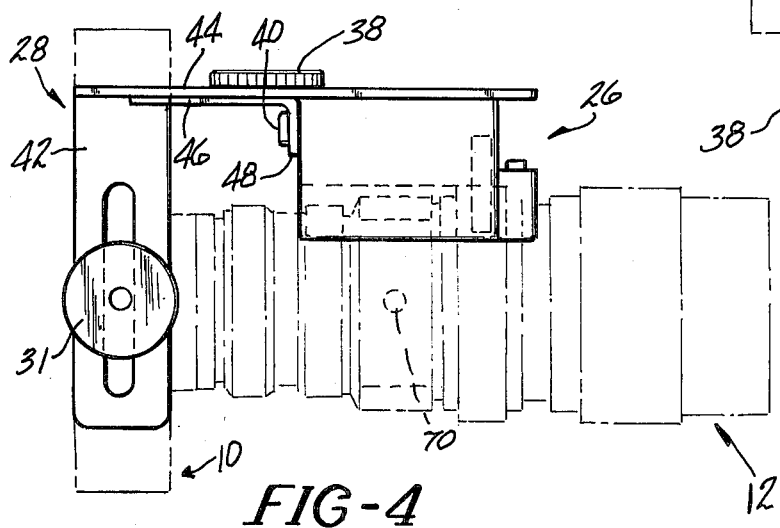
FIG. 4 is a bottom plan view of the apparatus of FIGS. 1, 2 and 3.

FIG. 1 is a top, right, front perspective view and FIGS. 2, 3 and 4 are side, front and bottom views of an accessory apparatus 16 which is attached to a conventional 35 mm SLR camera body 10 having a telephoto zoom lens 12 attached to and orthogonally projecting from a front face 14 of the camera body 10. The telephoto zoom lens 12 includes a focusing ring 18 and a zoom ring 20 for focusing and zooming the zoom lens, respectively. The particular camera body and zoom telephoto lens used can vary among many of the wide variety available commercially.

The accessory apparatus 16 of FIG. 1 comprises a wheel 24, a motor 26, a bracket 28, a switch module 30 and a connector 31 (see FIGS. 3 and 4). Wheel 24 is a soft rubber disc-shaped wheel or is made out of other soft material, while the zoom ring 20 of a conventional zoom telephoto lens is normally a hard surface such as plastic, hard rubber or metal. Wheel 24 is mounted upon and rotatively engaged by motor 26, although wheel 24 could be mounted in many other ways so long as it rotatably engages both the motor 26 and the zoom ring 20. It will be understood from the description below of the accessory apparatus that the wheel 24 could alternatively be engaged to focusing ring 18, if so desired.

Motor 26 is a conventional self-contained drive motor preferably a reversible electrical motor powered by a nine volt battery and is selectively operated in forward or reverse by manipulation of switch 30. Motor 26, which will be described below with reference to FIG. 8, is attached to bracket 28, and has a shaft 32 (see FIG. 8) which rotates about an axis perpendicular the axis of lens 12 and the wheel 24 is preferably mounted with its axis parallel to the axis of each of lens 12 and shaft 32.

Bracket 28 comprises a pair of right angle portions 34, 36 and a pair of adjustment thumb screws 38 and 40. First bracket portion 34 has a first planar leg 42 lying along the bottom of camera body 10 and a second planar leg 44 lying perpendicular to said first leg 42 and parallel the axis of lens 12 and shaft 32. Second bracket portion 36 has a third planar leg 46 lying adjacent to and parallel with said second leg 44 and a fourth planar leg 48 perpendicular to both said first leg 42 and said second and third legs 44, 46. As shown, leg 42, 44 and 46 lie horizontal while leg 48 lies vertical, however it is clear that camera body 10 can be turned many different directions and that the orientation of legs 42, 44, 46 and 48 will thus correspondingly vary. Also, legs 42, 44, 46 and 48 can be non-perpendicular relative to each other, although such would detract from the adjustability unless additional legs (not shown) were added. First thumbscrew 38 is provided to selectively force legs 44 and 46 against each other to prevent relative movement therebetween and alternatively release legs 44 and 46 from each other for axial positioning of wheel 24 relative to lens 12 so as to enable engagement of wheel 24 with an adjustment ring of lens 12, such as zoom ring 20 or focusing ring 18. Second thumbscrew 40 serves to selectively attach motor 26 snugly to fourth leg 48 of second bracket portion 36 and alternatively allow sliding movement of motor 26 relative to leg 48 so that wheel 24 can be vertically positioned so as to engage an adjustment ring of lens 12. Legs 42, 44, 46 and 48 can be slotted so as to allow horizontal lateral, horizontal forward and backward, horizontal forward and backward and vertical adjustment of the bracket in order to properly position wheel 24. The wheel 24 is preferably mounted directly on shaft 32 of motor 26 so that no additional movement is needed to assure engagement of shaft 32 with wheel 24, although a more sophisticated and resultantly more expensive version of apparatus could be readily built within the scope of the invention.

Figure 8:
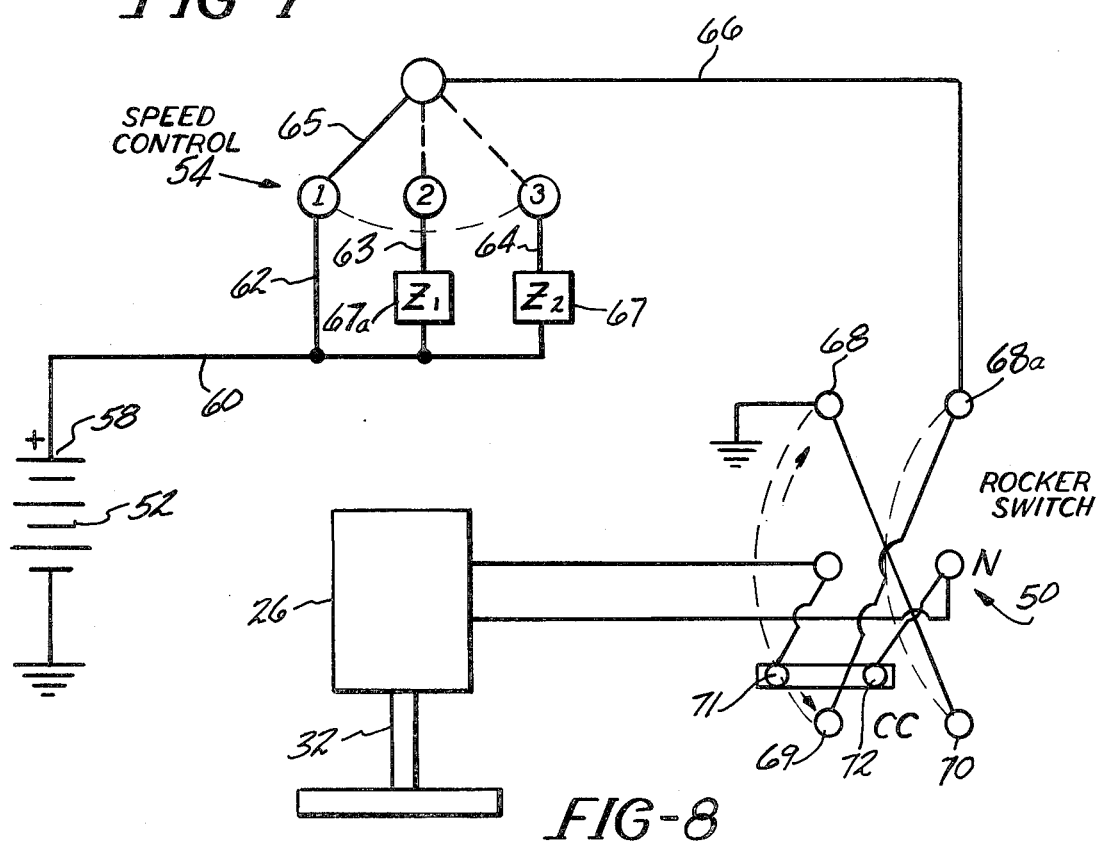
FIG. 8 is a schematic diagram of an electrical circuit for use in the apparatus of FIGS. 1-7.

The switch module 30, which is best understood by reference to the schematic electrical circuit diagram of FIG. 8, comprises a battery 52, speed control 54 and a rocker switch 50. Battery 52 is a nine volt negative grounded battery with its positive terminal 58 connected by lead 60 to speed control 54.

Since it is advantageous to have at least two motor speeds, and preferably three, speed control 54 includes three electrically parallel contact leads 62, 63 and 64, and a movable contactor 65. Contactor 65 is selectively positioned to contact a single selected one of parallel leads 62, 63 and 64. Leads 63 and 64 have Zener Diodes 67 and 67a placed therein, respectively, Zener Diode 67 causing a greater voltage drop across lead 64 and Zener Diode 67a causing a somewhat lesser voltage drop across lead 63 than lead 64. Lead 62, having no Zener Diode, serves to pass current with the least voltage drop. Contactor 65 is placed in contact with one of leads 62, 63 and 64 to provide a fast, medium or slow motor speed, respectively. Speed control 54 can be replaced by a speed control with more or less contacts or even a rheostat type control to achieve whatever speed control is desired. Contactor 65 is in turn connected by wire 66 to a first terminal 68a of rocker switch 50. Rocker switch 50 includes two pairs of spaced terminals 68,68a and 69,70, rocker contacts 71,72 and wires 73,74 which lead to two poles of motor 26. Rocker contacts 71,72 are selectively movable between three positions. The first position is where contacts 71 and 72 are engaged with contacts 68,68a respectively and the motor 26 and attached wheel 24 are caused to turn clockwise. The second position is a normal neutral position where contacts 71,72 are not engaged with either contacts 68,68a or contacts 69,70 and hence motor 26 is not rotated. The third position is where contacts 71 and 72 are engaged with contacts 69 and 70 respectively and the motor 26 and wheel 24 are caused to turn counterclockwise. Rocker switch 50 is center-biased toward a normal neutral second position above noted, so that motor 26 and wheel 24 do not turn unless activated by movement of contacts 71 and 72 to either the first or third position.

Connector 31 is a thumbscrew which fits through leg 42 and selectively forces leg 42 against the bottom of camera body 10 by screwing into the standard tripod socket or accessory connector (not shown) of camera body 10. By slightly loosening connector 31, leg 42 is freed for horizontal lateral adjustment as part of the positioning of wheel 24 above described.

The operation of accessory apparatus 16, which is self-evident from the above description, will now be described. Wheel 24, motor 26 and switch module 30 are loosely mounted as a unit upon leg 48 of second bracket portion 36 by loosely tightening thumbscrew 40. Legs 46 and 44 are then aligned and thumbscrew 38 is loosely tightened. Next connector 31 is loosely tightened into the tripod or accessory socket of camera body 10. Wheel 24 is now positioned against a selected adjustment ring, such as zoom ring 20 and thumbscrews 38 and 40 and connector 31 tightened firmly to hold wheel 24 in position. The operator can now hold the camera body with one hand, normally the right hand, and adjust the focus ring 18 with his other hand. The little finger or "pinky" of the other hand, normally the left hand, can simultaneously be placed on rocker switch 50 and wheel 24 rotated by manipulation of switch 50 to adjust zoom ring 20. Thus the operator has single handed operation without hand changes to adjust simultaneously the zoom ring 20 and the focusing ring 18 of lens 12.

Figure 5:
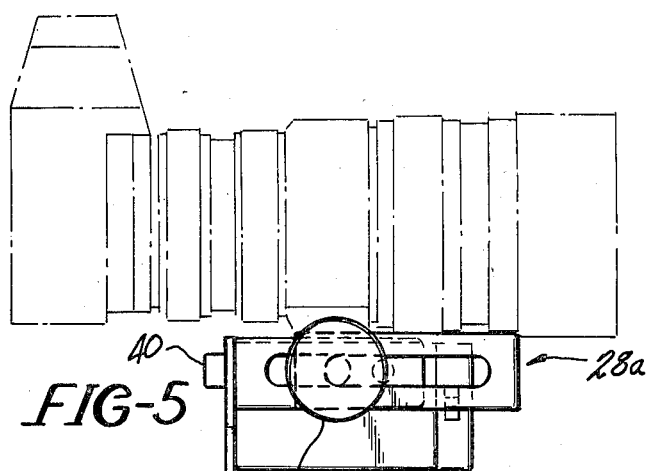
FIG. 5 is a side elevational view of a modified embodiment of the apparatus attached to a still camera lens.
Figure 6:
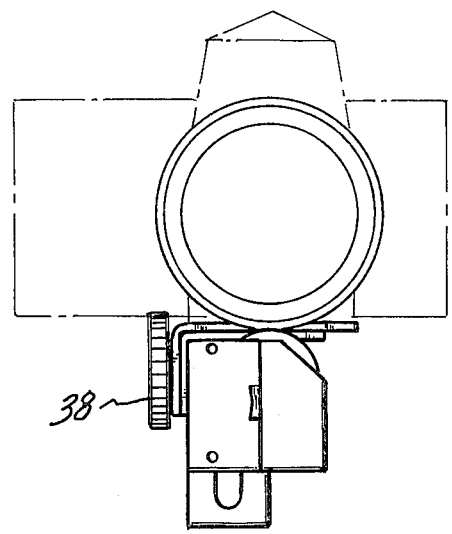
FIG. 6 is a front elevational view of the apparatus of FIG. 5.
Figure 7:
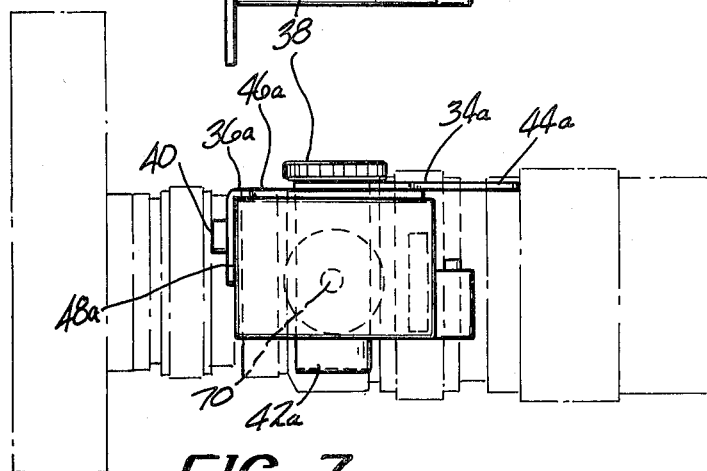
FIG. 7 is a bottom plan view of the apparatus of FIGS. 5 and 6.

FIGS. 5, 6 and 7 are side, front and bottom views corresponding to FIGS. 2, 3 and 4 but showing a modified bracket 28a used in place of bracket 28. Bracket 28a is designed to fit into the tripod socket 70 normally provided on the bottom side of large telephoto lenses. Bracket 28a includes first and second portions 34a and 36a. Portion 34a is a right angle member having longitudinally slotted perpendicular first and second legs 42a and 44a, and portion 36a is a right angle member having first and second longitudinally slotted legs 46a and 48a. Legs 42a is adapted to cross laterally under socket 70 and receive connector 31 to adjustably affix leg 42a to lens 12. Leg 44a lies horizontal and parallel to the axis of lens 12 and shaft 32 and is perpendicularly attached to the right end of leg 42a. Leg 46a lies in parallel abutment to leg 44a and is adjustably affixed to leg 44a by thumbscrew 38 to provide for axial length adjustment relative to lens 12. Leg 48a is perpendicularly attached to leg 46a and lies vertically along the rear of motor 26 and is adjustably affixed to motor 26 by thumbscrew 40. Bracket 28a can be adjusted in similar manner to bracket 28 by loosely positioning the bracket portions so that wheel 24 is engaged to an adjustment ring of lens 12 and then tightening thumbscrews 38 and 40 and connector 31 to fix and hold the position of apparatus 16.

Thus, the unit or apparatus 16 is mounted either on the camera body 10 or on the zoom lens 12. For mounting on camera body 10 (see FIGS. 1-4), the "camera bracket" or first bracket portion 34 is fixed to the bottom of the camera body 10 with the "camera thumbscrew" or connector 31. The motor 26 is attached to the "motor bracket" or second bracket portion 46 by a "motor bracket screw" or thumbscrew 40, and the second bracket portion 46 then connected to the camera bracket by thumbscrew 38. Connector 31, thumbscrew 38 and thumbscrew 40 allow lateral axial and vertical adjustment, respectively of motor 26 and wheel 24 relative to lens 12 to allow the unit to fit almost any zoom lens.

When the rocker switch 50 is activated or fully pushed in either direction from its normal neutral position (see FIG. 8), the motor rotates the drive wheel 24 which in turn rotates the zoom ring 20 or other engaged lens ring, either clockwise or counterclockwise depending on the direction which rocker switch 50 is pushed. Frictional contact is used between wheel 24 and ring 20, and when ring 20 reaches the end of its rotation, wheel 24 will keep on turning until the operators finger releases pressure on the rocker switch 50. It is not necessary to automatically shut off motor 26 because the soft wheel 24 deforms slightly, relaxes its friction grip and rotates virtually without any noticeable damage when the zoom ring 20 stops while wheel 24 is still turning.

From the foregoing description it will be appreciated that many modifications will suggest themselves to the ordinarily skilled artisans to whom this disclosure is directed. Also, it is readily apparent that the apparatus 16 will be made as light as possible consistent with providing sturdiness sufficient for a prolonged useful life. The invention, as defined in the following claims, is intended to cover all such equivalents whether or not precisely depicted herein.

What is claimed is:

1. A self-contained accessory apparatus for use with a wide variety of shapes and sizes of still cameras of the type having a still camera body, a lens with a first rotatable adjustment ring and an accessory connector, said apparatus comprising:
   (a) connector means for releasably attaching the apparatus to one of the camera body and lens;
   (b) wheel means for engaging the first adjustment ring;
   (c) self-contained motor means for engaging said wheel and rotating the first adjustment ring by rotating said wheel responsive to a signal;
   (d) manual switch means, operably connected to said self-contained motor means, for selectively providing said signal in response to manipulation of said switch means regardless of the inclination of the camera; and
   (e) bracket means, attached to said motor means and said connector means, for adjustably positioning said wheel means into engagement with the adjustment ring.

2. The accessory apparatus of claim 1 wherein the adjustment ring has limited rotation and said wheel means is deformable so as to allow continued rotation of said wheel means when said adjustment ring reaches its limit of rotation and said switch means is still providing said signal to said motor means.

3. The apparatus of claim 2 wherein said wheel means is comprised of an elastomeric material.

4. The accessory apparatus of claim 1 wherein said connector means is for connecting said apparatus to a standard threaded female accessory hole of the camera body.

5. The accessory apparatus of claim 1 wherein said connector means is for connecting said apparatus to a standard female threaded accessory of the lens.

6. The accessory apparatus of claim 1 wherein said wheel means comprises means for automatically releasable frictional engagement with the adjustment ring.

7. The accessory apparatus of claim 1 wherein said motor means has at least two different selectable speeds of rotation in both forward and reverse.

8. The accessory apparatus of claim 1 wherein said motor means comprises a reversible electric motor and said switch means includes a first position for causing rotation of said wheel in a first direction, a second position for causing rotation of said wheel in a second direction opposite said first direction, and a third neutral position for causing no rotation of said wheel.

9. The accessory apparatus of claim 8 wherein said switch means is biased toward said neutral position so that no rotation of said wheel occurs unless said switch means is forced to one of said first and second positions.

10. The apparatus of claim 1 wherein said self-contained motor means includes a battery for powering said motor means so that no external electrical power source is needed.

11. The apparatus of claim 1 wherein said bracket means is adapted to position said switch means below the camera lens.

12. The apparatus of claim 1 wherein said lens is a zoom lens with a zoom ring, said bracket means is for positioning said wheel means against the zoom ring of said zoom lens.

13. An accessory apparatus for use with a still camera of the type having a still camera body, a lens with a rotatable adjustment ring and an accessory connector, said apparatus comprising:
   (a) connector means for releasably attaching the apparatus to one of the camera body and the lens;
   (b) wheel means for engaging the adjustment ring;
   (c) motor means for engaging said wheel means and rotating the adjustment ring by rotating said wheel responsive to a signal;
   (d) switch means, operably connected to said motor means, for selectively providing said signal; and
   (e) bracket means, attached to said motor means and said connector means, for adjustably positioning said wheel means into engagement with the adjustment ring where said bracket means includes:
      (i) a first bracket portion having first and second longitudinally slotted planar legs at right angles to one another, said first leg being adapted to lie along the bottom of the camera body and be adjustably connected to said camera body by said connector means;
      (ii) a second bracket portion having third and fourth longitudinally slotted legs at right angles to one another, said fourth leg being adapted to be connected to and support said motor means;
      (iii) a first connection device for releasably affixing said second and third legs together; and
      (iv) a second connection device for releasably affixing said fourth leg to said motor means.

14. The accessory apparatus of claim 13 wherein said first and second connection devices are thumbscrews.

* * * * *